March 11, 1952     W. BORNEMANN     2,588,954
AUTOMATIC PHOTOGRAPHIC CAMERA
Filed Feb. 17, 1949     2 SHEETS—SHEET 1
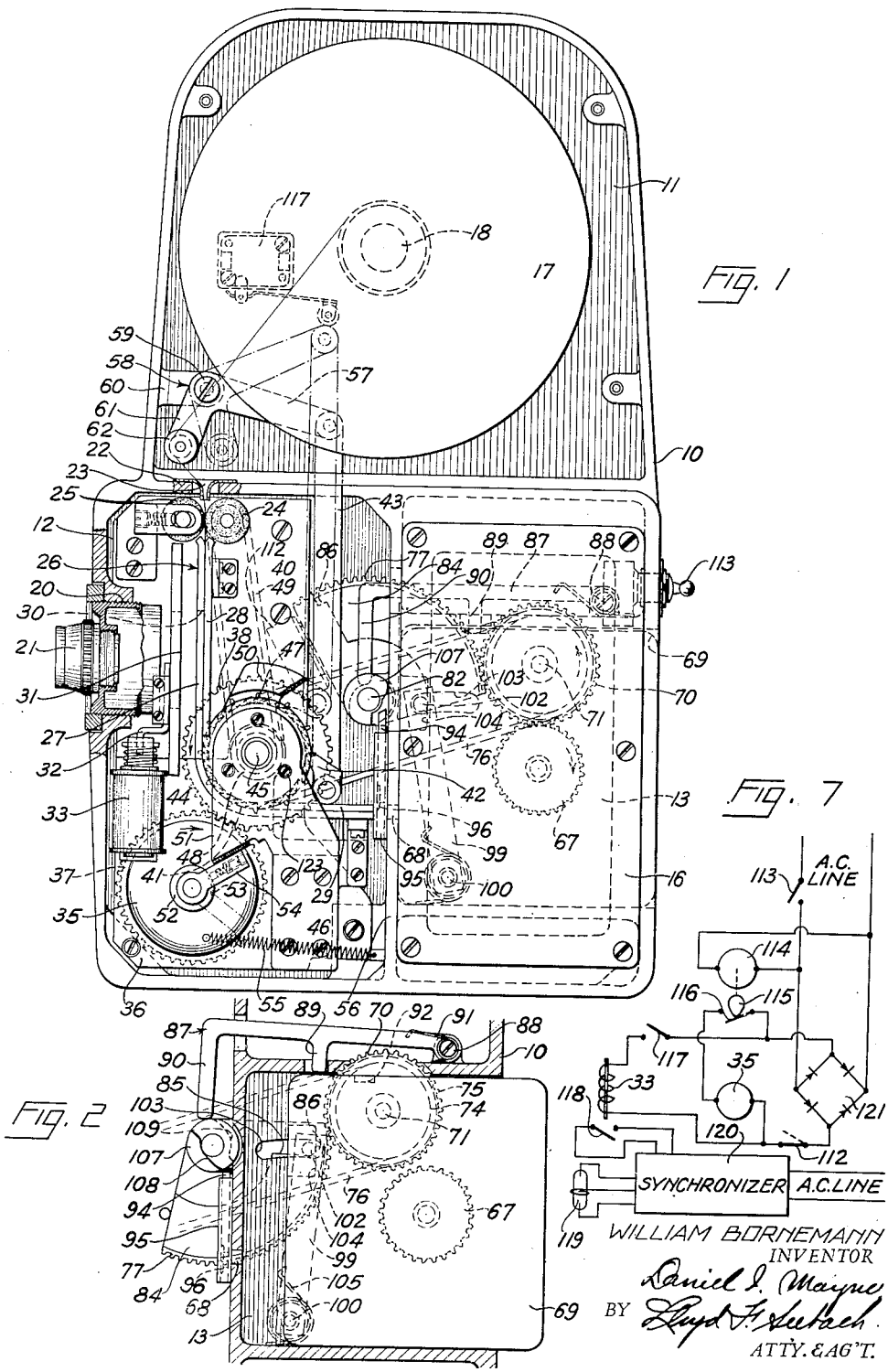
WILLIAM BORNEMANN
INVENTOR

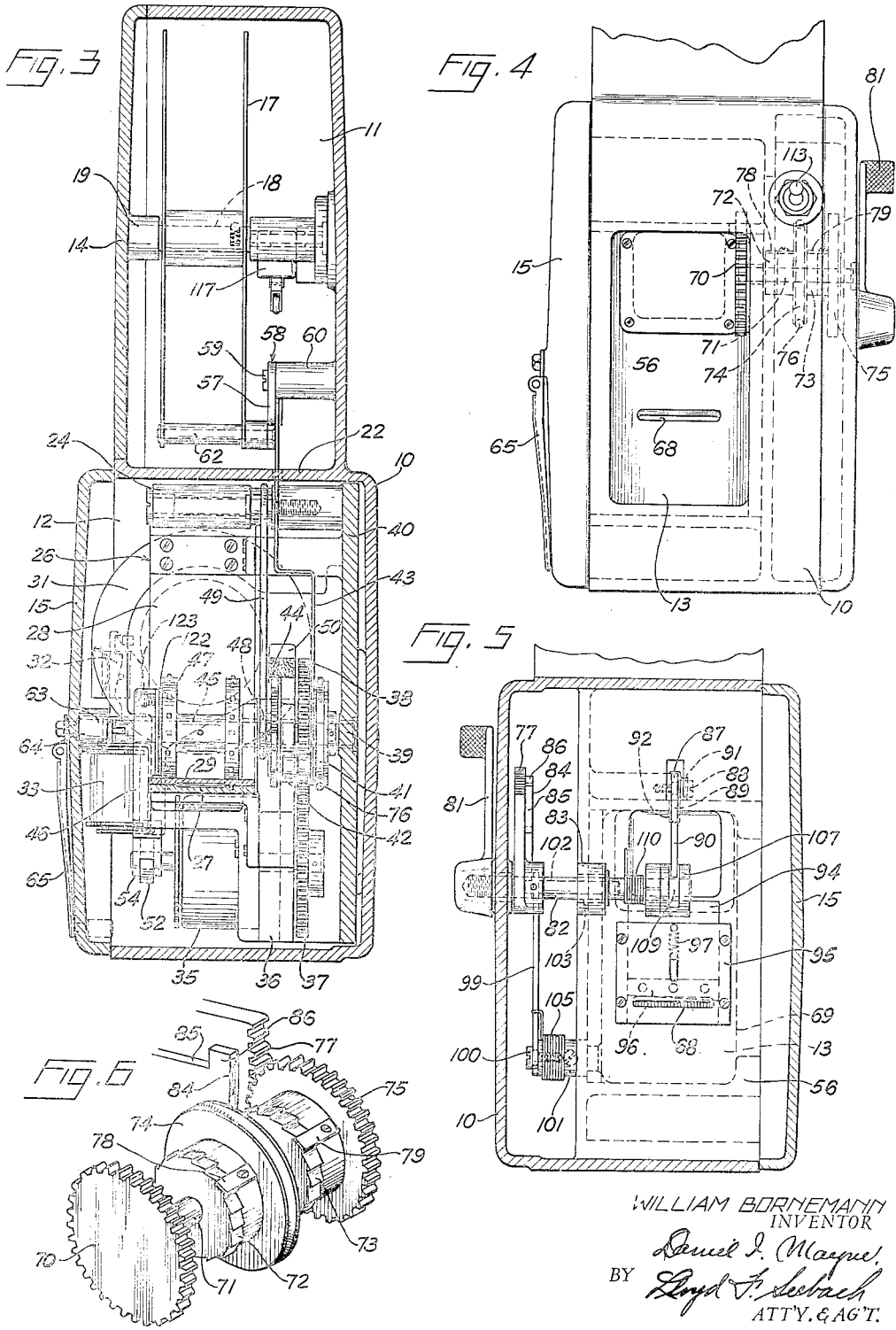

Patented Mar. 11, 1952

2,588,954

UNITED STATES PATENT OFFICE 2,588,954

AUTOMATIC PHOTOGRAPHIC CAMERA

William Bornemann, Rochester, N. Y., assignor to Eastman Kodak Company, Rochester, N. Y., a corporation of New Jersey Application February 17, 1949, Serial No. 76,905

10 Claims. (Cl. 95—34)

This invention relates to photography and, more particularly, to photographic cameras in which all of the normal manual operations for making an exposure are automatically performed by the camera mechanism and in which the exposed sensitized material is fed into a magazine for removal at any time from the camera.

Automatic cameras in which the actuation of a single button, or of a means not a part of the camera, results in tripping of the shutter and advancing of the sensitized material or film are well known. However, in this type of camera, the film is usually contained in rolls providing a designated number of exposures, and the film is not removable at any time unless some of the film is wasted by opening the camera before the last exposure has been made. A further disadvantage in fully automatic cameras is that no provisions are made for winding the last exposed area into a position for severing it from the remainder of the film and then being able to wind the severed film into a magazine independently of the normal means for advancing the film frame by frame.

In applications of photography to industrial use, the camera is usually set up at a station and actuated by movement of the object to be photographed or at predetermined intervals without any attendance by an operator. The camera, therefore, must of necessity be completely automatic and contain sufficient film for a large number of exposures so that frequent reloading is eliminated. In a camera intended for such industrial purposes, it is also a primary requisite that the exposed portion of the film strip is readily available, that is, the exposed film must be removable from the camera at any time without waiting for exposure of the entire film supply, particularly if the photographic study is to be made over a considerable period of time. This is accomplished in the present invention by providing a film take-up magazine into which the exposed film is advanced and by providing a manually operable winding member which can be actuated at any time to wind the last exposed film area beyond a severing means, to actuate a severing means, and then to wind the severed and exposed film strip completely into the magazine. The means for winding the exposed area of film into the magazine is independent of the drive means for advancing the film strip frame by frame and also serves to release a locking means to permit ejection of the magazine and to render inoperative normal operation of the camera until an empty magazine is again inserted in the chamber.

The primary object of the invention, therefore, is to provide a photographic camera which is entirely automatic in its normal sequence of operation wherein the film strip is advanced frame by frame into a take-up magazine and in which the film strip may at any time be advanced, severed, and the severed portion of the strip advanced into the magazine independently of the normal automatic operation of the camera.

Another object of the invention is to provide a fully automatic camera in which a manually operable winding means can be actuated at any time to advance the last exposed film area beyond a severing means, to tension the film strip between the severing means and the take-up core of the magazine during severing of the film strip, and then advance the severed film strip into the take-up magazine.

Still another object of the invention is to provide a fully automatic camera in which a drive member for rotating the magazine take-up core is operatively connected to the automatic film advancing means and to a manually operable winding means and adapted to be rotated in the same direction upon actuation of either of said means.

And yet another object of the invention is to provide a fully automatic camera in which a manually operable winding means may be actuated at any time to advance the film strip into a take-up magazine and to release a locking means to permit ejection of the magazine from the take-up chamber.

And still another object of the invention is to provide a fully automatic camera in which a manually operable winding means may be actuated at any time to advance the film strip into a take-up magazine and to render inoperative normal automatic functioning of the camera until another magazine is inserted in the magazine chamber.

Other objects and advantages will be apparent to those skilled in the art from the description which follows.

The objects of the invention are embodied in a camera having a chamber adapted to receive a magazine, a guideway provided with an exposure aperture and for directing a sensitized material to said chamber, a locking means for holding said magazine in said chamber, a severing means between said guideway and said chamber for severing said sensitized material, a magazine ejecting means movable to a retracted position, by insertion of a magazine into said chamber, and maintained in said retracted position by the engagement of said magazine with said locking means, a winding assembly including a manually operable winding drive member and a take-up drive member in said chamber adapted to engage and to rotate the take-up of said magazine and operable at any time for moving the area of said sensitized material at said exposure aperture past said severing means and for moving the severed sensitized material into said magazine, an advancing means including a rotatable member for engaging and moving a predetermined amount of sensitized material past said exposure aperture and a prime mover for imparting rotation to said rotatable member, a unidirectional clutch means including a drive member and between said rotatable member and said prime mover, a second unidirectional clutch means between said winding drive member and said take-up drive member and including a winding driven member engaging said winding drive member, a driven member operatively connected to the drive member of said first-mentioned clutch means, a clutch drive member on said winding driven member and said driven member, and clutch driven members in engagement with said clutch drive members for rotating said take-up drive member, both of said unidirectional clutch means being rotated in the same direction and independently capable of rotating said take-up drive member, and an actuating means operatively connected to said locking means and said severing means and movable with said winding assembly for actuating said severing means after said area of sensitized material has been moved past said severing means and for actuating said locking means after the severed sensitized material has been moved into said magazine to permit said ejecting means to eject said magazine from said chamber.

Obviously the aforementioned means and elements not only combine to produce the complete combination described, but said elements also cooperate two or more at a time to produce other combinations or sub-combinations which are contemplated by the invention and claimed hereinafter. Thus, the present invention is not to be limited by the illustrated embodiment thereof but has a scope as broad as the interpretation of the claims permit.

Reference is now made to the accompanying drawings wherein like reference numerals designate like parts and wherein:

Fig. 1 is a side elevation of a camera embodying the present invention with the mechanism chamber and supply chamber covers removed and showing the position of the various elements at the beginning of an exposure cycle and with a magazine in the magazine chamber;

Fig. 2 is a partial section through the magazine chamber showing the position of the winding assembly, the holding means, the severing means, the locking means, the ejecting means and the actuating means after ejection of a magazine or upon insertion of a magazine into the magazine chamber;

Fig. 3 is a vertical section through the camera casing showing the film advancing means in an end elevation;

Fig. 4 is an end elevation of the camera showing the magazine chamber and the drive member for engaging the magazine take-up;

Fig. 5 is a vertical section through the mechanism portion of the camera casing and showing the winding assembly, the locking means, the severing means and the actuating means in end elevation;

Fig. 6 is a schematic perspective view of the unidirectional clutch means between the winding assembly and the drive member for the magazine take-up; and Fig. 7 is a schematic wiring diagram of the circuits for providing automatic operation of the camera.

Although the present disclosure of the invention is described as being embodied in a photographic camera, it shall be understood that this invention may also be applied to many and various other types of film handling apparatus of the magazine type. In the illustrated embodiment of the invention, the camera casing 10 is provided with a supply chamber 11, a mechanism chamber 12 and a take-up or magazine chamber 13, each having a cover 14, 15 and 16, respectively. The film supply reel or magazine 17 is rotatably mounted on spindle 18 in chamber 11 and is maintained in a properly aligned position by the boss 19 on cover 14. The front wall of the chamber 12 is provided with a threaded aperture 20 for receiving the lens mount 21. The wall 22 which separates the mechanism and supply chambers is provided with an aperture 23 through which the film strip is advanced from the reel 17 to the mechanism chamber. The film strip passes between the driven rubber roller 24 and the idler spring-biased rubber roller 25 and into the guideway 26. The guideway 26 comprises a plate 27 which extends vertically from the rollers 24 and 25 to a point beyond the field of the camera lens where it is formed with a 90° arcuate portion and a horizontal extension, a plate 28 with the vertical extension of the plate 27 provides the vertical guideway, and a plate 29 with the horizontal extension of the plate 27 provides a horizontal guideway to the magazine chamber 13, see Fig. 1. The plates 27, 28 and 29 are relieved centrally in a well-known manner so that said plates engage only the edges of the film strip, and the plate 27 is provided with an exposure aperture 30 in alignment with the camera lens. A shutter 31 is mounted between the camera lens and the vertical portion of the guideway 26 and is actuated in a sequence described hereinafter by the link 32 connecting the shutter to the solenoid 33, see Figs. 1 and 3.

The advancing means for automatically advancing the film strip by a predetermined amount for each exposure, see Figs. 1 and 3, comprises a prime mover or a circular solenoid 35, which is mounted on the bracket 36, the shaft thereof oscillating the gear 37 on the opposite side of said bracket, see Fig. 3. The gear 37 meshes with a gear 38 on the stub shaft 39 which is journaled in the mechanism plate 40 and the bracket 36. A drive member or pulley 41 is secured to shaft 39 adjacent the plate 40. Since gears 37 and 38 are oscillated, the gear 38 is provided with an extension on which the pawl 42 and the formed lever 43 are pivotally mounted. The pawl 42 is spring-biased into engagement with ratchet 44 which is secured to shaft 45 aligned with stub shaft 39, said shaft 45 being journaled in a U-shaped bracket 46 mounted on bracket 36. The ratchet 44 and pawl 42 constitute a unidirectional clutch means between shaft 39 on which pulley 41 is fixed and shaft 45 on which sprocket 47 is secured. The film sprocket 47 is pinned to shaft 45 between the legs of bracket 46 and engages the film perforations to move the film strip in a manner about to be described. The plate 27 is provided with suitable grooves for the sprocket teeth. A pulley 48 integral with the ratchet 44 drives roller 24 by means of the belt 49.

The bracket 36 has integral therewith an extension 50 which lies in the path of pawl 42, and bracket 46 is provided with an extension 51 which arrests the motion of solenoid 35. The extending shaft of solenoid 35 has fixed thereto a collar 52 provided with detents 53 and a bifurcated member 54 which acts as a stop for the solenoid in its released position. The member 54 is adjusted to engage the proper detent in collar 52 for movement therewith and for advancing the proper amount of film in accordance with the camera lens to be used. A proper mask, not shown, is also inserted in guideway 27 at the exposure aperture. A spring 55 connects the solenoid 35 with a pin on wall 56.

The lever 43 is pivotally connected to the arm 57 of bell-crank lever 58 which is pivotally mounted at 59 on boss 60 in chamber 11, see Fig. 1. The other arm 61 of lever 57 carries a loop-forming roller 62. The film strip path from reel 17 is around roller 62, through aperture 23, and into the bite of rollers 24 and 25.

The cover 15 carries a stub shaft 63 which has a tongue for engaging a slot in the end of shaft 45 and is freely rotatable in boss 64 of said cover. A pivoted handle 65 is provided with an aperture for engaging the squared end of shaft 63 in a well-known manner and in its inoperative position is folded against cover 15, as shown in Fig. 3.

The wall 56 is provided with an aperture 68 through which the film strip is advanced into the magazine chamber 13. The magazine 69 which is inserted in said chamber may be of the type disclosed and described in the copending U. S. application filed February 17, 1949, in my name and that of R. A. Gordon and having Serial No. 76,906, now Patent No. 2,578,283, dated December 11, 1951. The core or take-up of magazine 69 is driven through gear 67 in the magazine which meshes with the gear or drive member 70 contained within chamber 13. The gear 70 is mounted on a shaft 71 which is journaled in one wall of the chamber and a wall of the casing, see Fig. 4. The shaft 71 has rotatable therewith, see Fig. 6, a ratchet 72 and a ratchet 73 with a pulley 74 between said ratchets and a gear 75 freely rotatable on said shaft, see Fig. 6. The pulley 74 is connected by the belt 76 to pulley 41, and the gear 75 meshes with the gear sector 77. Resilient drive members 78 and 79 are fixed to the hubs of the pulley 74 and the gear 75, respectively. From the description hereinafter it will be noted that the elements rotatable with the shaft 71 and freely rotatable thereon, in effect, constitute a second unidirectional clutch means for rotating the drive member or gear 70 to rotate the take-up of the magazine in chamber 13.

The winding assembly comprises an external manually operable handle 81 which rotates the shaft 82 journalled in the wall of casing 10 and a bearing 83 on wall 56, the gear sector or winding member 77 being rotatable with shaft 82 and meshing with gear 75. The gear sector 77 carries therewith a flat arcuate plate 84 which is provided at one end with a substantially radial extending surface 85 terminating in a lug-like extension 86 and serves as the holding means for the winding assembly in a manner to be described hereinafter.

The locking means, see Figs. 2 and 5, comprises a lever 87 which is pivotally mounted at 88 on casing 10 above magazine chamber 13 and which has a locking member or extension 89 and an actuating member or portion 90. The lever 87 is urged toward magazine 69 by spring 91 for engaging a detent 92 in the camera casing by which the magazine is held in position in the chamber.

The severing means, see Figs. 1, 2 and 5, comprises a plate 94 which is slidably mounted in the retaining block 95 on wall 56, and a knife edge or plate 96 fixed to plate 94. The plate 94 is maintained in its upper position by the spring 97 and in this position permits free passage of the film strip from the guideway 26 through the aperture 68 and into the magazine 69.

The ejecting means, see Figs. 1, 2, and 5, comprises a lever 99 pivotally mounted at 100 on boss 101 extending from the side wall of chamber 13, a pin 102 extending through lever 99 and having one end thereof engaging the inner arcuate surface of plate 84 in the retracted position, as shown in Fig. 1, or the radial surface 85 and extension 86 in the ejecting position, as shown in Fig. 2, and the other end thereof passing through the arcuate slot 103 for engaging a suitable detent 104 in the side wall of magazine 69. A coil spring 105 tends to urge the lever 99 into its ejecting position.

The actuating means, see Figs. 2 and 5, comprises a cam 107 having a cam surface 108 for engaging the plate 94 of the severing means and a cam surface 109 for engaging the actuating member 90 of the locking means. The cam is secured to shaft 82 and is rotated with sector 77 upon actuation of handle 81, the shaft and its associated parts being returnable to their normal positions by the coil spring 110.

The cooperation between the various elements and parts of the camera can best be understood from a description of its operation in conjunction with the schematic wiring diagram of Fig. 7. The winding assembly, the holding means, the severing means, the ejecting means and the actuating means are normally in the positions shown in Fig. 2 until a magazine is inserted in the chamber 13. As the magazine 69 is inserted into the chamber 13, the detent 104 engages the pin 102 and moves it along surface 85 toward the inner arcuate surface of plate 84 and at the same time moving lever 99 about its pivot 100. When pin 102 reaches the arcuate surface, the spring 110 returns handle 81, gear sector 77, and cam 107 to their winding position, the cam surface 109 permitting locking member 89 to engage the detent 92 on the magazine for maintaining the magazine in the chamber against the action of the spring 105, and the cam surface 108 permitting the spring 97 to return the plate 94 to its upper position for opening the aperture 68 into the magazine chamber 13. When the magazine is in position, gear 70 will be in mesh with gear 67 on the magazine, and gear sector 77, then in its winding position, will have closed the switch 112. The film supply is then placed in the chamber 11 by sliding the reel 17 on the spindle 18. The film strip is threaded around roller 62 and pushed through aperture 23 until the leading end of the film strip enters the bite of the rollers 24 and 25. The chamber 11 is then enclosed by securing the cover 14 in position. The handle 65 is moved from its fold-down position to its winding position in which it engages the square end of the stub shaft 63. Upon rotation of the handle 65 in a counter-clockwise direction, see Fig. 1, the shaft 45 is rotated through the tongue and groove connection between shafts 45 and 63, sprocket 47, ratchet 44 and pulley 48 being rotated therewith. Since ratchet 48 is rotated in a counter-clockwise direction it moves freely under the pawl 42 without rotating the pulley 41. Pulley 48 through belt 49 drives the roller 24 and the film strip is moved through the guideway 26, beneath the severing knife 96, through the aperture 68 and into the magazine 69. The leading end of the film strip may be secured to the take-up core of the magazine 69 in a manner described in the above-mentioned co-pending patent application. The handle 65 is given a sufficient number of turns to insure that any film which was fogged during loading or threading is advanced into the magazine. The camera is then ready for making exposures and the various parts are in the positions shown in Figs. 1 and 7.

The automatic operation of the camera is started upon closing the line switch 113, see Fig. 7, thereby energizing the timing motor 114. Timing motor 114 rotates an actuating cam 115 which opens and closes switch 116 for controlling energization of solenoid 35. In the present instance, the timing motor and cam provide for one exposure a second, although by providing a suitable gear train or by altering the cam, the number of exposures per minute can be increased or decreased. Further, since the camera has been designed primarily for industrial use, actuation of the switch 116 may be controlled by means of a photocell, a tripping circuit or by any one of a number of other means, depending on the conditions under which the camera is to operate or the type of subject to be photographed.

Upon each closing of the switch 116, the solenoid 35 is energized and its rotary motion is transmitted from gear 37 to gear 38 for rotating stub shaft 39. As gear 38 is rotated, pawl 42 moves therewith engaging ratchet 44 to rotate pulley 48 integral therewith and shaft 45 to which sprocket 47 is secured, thereby moving the film strip through the guideway 26 and toward the magazine 69. As pawl 42 is moved with gear 38, lever 43 is moved vertically to rotate lever 58 about its pivot 59 thereby moving roller 62 toward aperture 23 to permit movement into aperture 23 of the film strip loop formed thereby. The pulley 41 being fixed to shaft 39 rotates pulley 74 on shaft 71 through belt 76. As pulley 74 is rotated, drive member 78 engages the ratchet 72 to rotate shaft 71 and gears 70 and 67, thereby rotating the take-up core of magazine 69. Movement of the sprocket 47 is arrested when pawl 42 engages the extension 50 on bracket 36 and coincides with the engagement of member 54 with extension 51 on bracket 46. When smaller film areas are exposed, because of a different camera lens being used, member 54 is adjusted to one of the other detents 53 in collar 52 to arrest movement of pawl 42 before it reaches extension 50. This adjustable stop controls movement of the solenoid and it is at this time that the solenoid 35 is deenergized by cam 115 opening switch 116. At the same time, link 43 is in the dotted line position as indicated in Fig. 1 and has closed shutter switch 117, thereby energizing the solenoid 33 for actuating shutter 31 and exposing the film area just advanced into the exposure aperture. In proper timed relation to the actuation of the shutter, the shutter operating solenoid 33 trips switch 118 for energizing a light source 119 through a suitable synchronizing circuit 120 for synchronizing energization of the light source with the actuation of the shutter.

Upon deenergization of solenoid 35 by opening of switch 116, the spring 55 returns the solenoid to its initial position. The gears 37 and 38, therefore, are rotated in the opposite direction, pawl 42 moving over ratchet 44, pulley 74 rotating freely on shaft 71, and drive member 78 moving over ratchet 72. To prevent rotation of sprocket 47 in a direction opposed to the normal movement of the film strip, a fibre or cork disc 122 is adjusted thereagainst by the screws 123. As pawl 42 is returned to its normal position with gear 38, the link 43 is moved downwardly to rotate lever 58 in a clockwise direction. Since the film strip is held against movement in the guideway 26 between rollers 24 and 25 and sprocket 47, the clockwise movement of arm 61 withdraws film from reel 17 to form a loop for the next advancement of the film strip. With this arrangement the film strip is relieved of any undue stresses imparted thereto by the sprocket quickly withdrawing film directly from the reel. The return of the various elements to their normal positions takes place during the time interval in which the switch 116 is in the open position, and the complete cycle of film advance and exposure takes place within a second every time the cycle is repeated.

The handle 81 may be operated at any time and after any number of exposures have been made to sever the film strip and release the magazine 69. Immediately upon movement of the handle 81 and the sector 77, the normally open switch 112, which is held closed by the sector 77 in its winding position, is opened thereby breaking the circuit through the D. C. rectifier 121 and rendering the camera inoperative. If the switch 112 were not provided and the camera was rendered inoperative only by opening switch 113, then it would be possible to close switch 113 and start the camera cycle without a magazine in the chamber or without the handle 81 in its winding position, and the film would become jammed in the guideway behind the knife 96. Gear sector 77 rotates gear 75, and the drive member 79 thereon picks up ratchet 73 on shaft 71 to rotate the shaft in the same direction as when rotated by pulley 74. The shaft 71 rotates gear 70 and through gear 67 the take-up of the magazine 69. Since pulley 74 is freely mounted on shaft 71, the ratchet 72 merely rotates under drive member 78 and there is no motion transmitted to pulley 41 and shaft 39. As the take-up core is rotated, the film strip is drawn into the magazine, thereby rotating the sprocket 47 and rollers 24 and 25 by means of the film strip. In this instance, also, ratchet 44 moves under pawl 42 without imparting any motion to shaft 39. The gear sector 77 and the drive to the take-up of the magazine 69 is of such a ratio that a quarter revolution of handle 81 is sufficient to wind the last exposed area of film completely into the magazine before sector 77 reaches the end of its movement. The cam surface 108 is so disposed radially on shaft 82, that it actuates knife 96 to sever the film strip immediately after the last exposed area of film has moved past the knife. This point, however, is not at the end of the movement of sector 77, since the end of the film strip extending out of the magazine and through the aperture 68 must still be wound into the magazine by further movement of sector 77. By maintaining the film strip movement continuous, the film strip is tensioned between the knife 96 and the take-up core of the magazine during the severing operation. This arrangement produces a cleaner cut and eliminates the need for disrupting movement of the take-up. When sector 77 reaches the end of its movement, the cam surface 109 will have been rotated to a point where actuating member 96 will have pivoted lever 87 to a position where locking member 89 will be freed from detent 92. At the same time, the surface 85 of plate 84 will have reached a position opposite pin 102 and spring 105 will then be free to move lever 99 to its ejecting position for moving the magazine 69 to the position shown in Fig. 2, the pin 102 being held against further movement by lug 86 on plate 84. The various parts, therefore, are then in the positions shown in Fig. 2 and upon insertion of another magazine are returned to their initial position as hereinbefore described.

From the foregoing description, it can be readily appreciated that the severing of the film takes place before the winding of the film strip into the magazine is completed and that the magazine is not unlocked or ejected until the film strip has been fully wound into the magazine. Also, the clutch means which permit rotation of the take-up drive member through either the film advancing means or the winding assembly are rotatable in only one and the same direction. Since other modifications of the invention are possible, the scope of the invention is not to be limited to the illustrated embodiments but is defined by the appended claims.

Having now particularly described my invention, what I desire to secure by Letters Patent of the United States, and what I claim is:

1. In a photographic apparatus, the combination with a casing having a chamber adapted to receive a magazine and having a drive member adapted to engage the take-up of said magazine, of a locking means for holding a magazine in said chamber, a magazine ejecting means movable to a retracted position, by insertion of a magazine into said chamber, and maintained in said position by the engagement of said magazine with said locking means, a winding assembly operatively connected to said drive member and operable at any time for moving the sensitized material into said magazine, and an actuating means operatively connected to said winding assembly and movable therewith to a position for releasing said locking means to permit said ejecting means to eject said magazine from said chamber.

2. In a photographic apparatus, the combination with a casing having a chamber adapted to receive a magazine and having a drive member adapted to engage the take-up of said magazine, of a locking means having an actuating member and a locking member and for holding a magazine in said chamber, a magazine ejecting means movable to a retracted position, by insertion of a magazine into said chamber, and maintained in said position by the engagement of said magazine with said locking member, a winding assembly operatively connected to said drive member and operable at any time for moving the sensitized material into said magazine, and an actuating means operatively connected to said actuating member and said winding assembly and movable with said winding assembly to a position for releasing said locking member to permit said ejecting means to eject said magazine from said chamber.

3. In a photographic apparatus, the combination with a casing having a chamber adapted to receive a magazine and having a drive member adapted to engage the take-up of said magazine, of a locking means pivotally mounted on said casing and comprising an actuating member and a locking member for holding a magazine in said chamber, a magazine ejecting means having a part engaging said magazine and movable to a retracted position, by insertion of a magazine into said chamber, and maintained in said position by the engagement of said magazine with said locking member, a winding assembly operatively connected to said drive member and operable at any time for moving the sensitized material into said magazine, and an actuating means including a cam operatively connected to said actuating member and movable with said winding assembly to a position for releasing said locking member to permit said ejecting means to eject said magazine from said chamber.

4. In a photographic apparatus, the combination with a casing having a chamber adapted to receive a magazine and having a drive member adapted to engage the take-up of said magazine, of a locking means pivotally mounted on said casing and comprising an actuating member and a locking member for holding a magazine in said chamber, a magazine ejecting means having a part engaging said magazine and movable to a retracted position, by insertion of a magazine into said chamber, and maintained in said position by the engagement of said magazine with said locking member, a winding drive member operatively connected to said drive member and operable at any time for moving the sensitized material into said magazine, and an actuating means including a cam operatively connected to said actuating member and movable with said winding drive member to a position for releasing said locking member to permit said ejecting means to eject said magazine from said chamber.

5. In a photographic apparatus, the combination with a casing having a chamber adapted to receive a magazine and having a drive member adapted to engage the take-up of said magazine, and a guideway provided with an exposure aperture and for directing the sensitized material to said chamber, of a locking means for holding a magazine in said chamber, a magazine ejecting means including a pivotally mounted lever having a magazine engaging part movable to a retracted position, by insertion of a magazine into said chamber, and maintained in said position by the engagement of said magazine with said locking means, a winding assembly operatively connected to said drive member and operable at any time for moving the sensitized material at said exposure aperture into said magazine, and an actuating means operatively connected to said winding assembly and movable therewith to a position for releasing said locking means after entry of said sensitized material into said magazine to permit said ejecting means to eject said magazine from said chamber.

6. In a photographic apparatus, the combination with a casing having a chamber adapted to receive a magazine and having a drive member adapted to engage the take-up of said magazine, and a guideway provided with an exposure aperture and for directing the sensitized material to said chamber, of a locking means pivotally mounted on said casing and comprising an actuating member and a locking member for holding a magazine in said chamber, a magazine ejecting means including a pivotally mounted lever having a part engaging said magazine and movable to a retracted position, by insertion of a magazine into said chamber, and maintained in said position by the engagement of said magazine with said locking member, a winding drive member operatively connected to said drive member and operable at any time for moving the sensitized material into said magazine, and an actuating means including a cam operatively connected to said actuating member and movable with said winding drive member to a position for releasing said locking member after entry of said sensitized material into said magazine to permit said ejecting means to eject said magazine from said chamber.

7. In a photographic apparatus, the combination with a casing having a chamber adapted to receive a magazine and having a drive member adapted to engage the take-up of said magazine, of a winding assembly operatively connected to said drive member and movable at any time from a normal position to a predetermined position for moving the sensitized material into said magazine, a holding means movable with said winding assembly, and a magazine ejecting means movable into an ejecting position and having a part engaging said holding means upon movement of said winding assembly into said predetermined position and movable, by insertion of a magazine into said chamber, to a retracted position to release said holding means for return of said winding assembly to said normal position.

8. In a photographic apparatus, the combination with a casing having a chamber adapted to receive a magazine and having a drive member adapted to receive a magazine and having a drive member adapted to engage the take-up of said magazine, of a winding drive member operatively connected to said drive member and movable at any time from a normal position to a predetermined position for moving the sensitized material into said magazine, a holding means on said winding drive member and movable therewith, and a magazine ejecting means movable into an ejecting position and having a part engaging said holding means upon movement of said winding drive member into said predetermined position and movable, by insertion of a magazine into said chamber, to a retracted position to release said holding means for return of said winding drive member to said normal position.

9. In a photographic apparatus, the combination with a casing having a chamber adapted to receive a magazine and having a drive member adapted to engage the take-up of said magazine, of a winding drive member operatively connected to said drive member and movable at any time from a normal position to a predetermined position for moving the sensitized material into said magazine, a holding means including a plate having an extending portion thereon and movable with said winding drive member, and a magazine ejecting means movable into an ejecting position and having a part engaging the extending portion of said plate for holding said winding drive member in said predetermined position and movable, by insertion of a magazine into said chamber, to a retracted position to release said plate for return of said winding drive member to said normal position.

10. In a photographic apparatus, the combination with a casing having a chamber adapted to receive a magazine and having a drive member adapted to engage the take-up of said magazine, of a winding drive member operatively connected to said drive member and movable at any time from a normal position to a predetermined position for moving the sensitized material into said magazine, a holding means including a plate having an extending portion thereon and movable with said winding drive member, and a magazine ejecting means including a pivotally mounted lever movable into an ejecting position and having a part thereof engaging the extending portion of said plate for holding said winding drive member in said predetermined position and movable, by insertion of a magazine into said chamber, to a retracted position to release said plate for return of said winding drive member to said normal position.

WILLIAM BORNEMANN.

REFERENCES CITED

The following references are of record in the file of this patent:

UNITED STATES PATENTS

| Number | Name | Date |
| --- | --- | --- |
| 2,293,195 | Cohen | Aug. 18, 1942 |
| 2,469,008 | Simmon et al. | May 3, 1949 |
| 2,474,159 | Pejois | June 21, 1949 |
| 2,477,904 | Schwartz | Aug. 2, 1949 |

FOREIGN PATENTS

| Number | Country | Date |
| --- | --- | --- |
| 563,308 | Great Britain | Aug. 9, 1944 |